Figure 1:
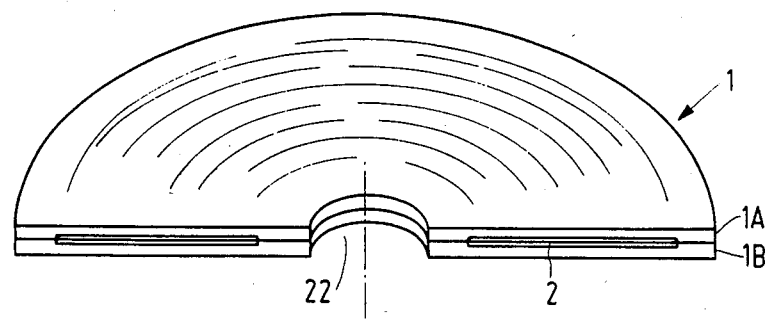

United States Patent [19]

Wouters et al.

[11] Patent Number: 4,795,511

[45] Date of Patent: Jan. 3, 1989

[54] METHOD OF MANUFACTURING AN OPTICALLY READABLE DISC RECORD AND DISC RECORD MANUFACTURED IN ACCORDANCE WITH THE METHOD

[75] Inventors: Henricus H. B. Wouters; Joannes H. J. van Dommelen, both of Eindhoven, Netherlands

[73] Assignee: U.S. Philips Corporation, New York, N.Y.

[21] Appl. No.: 51,968

[22] Filed: May 19, 1987

[30] Foreign Application Priority Data

May 26, 1986 [NL] Netherlands ............... 8601330

[51] Int. Cl.⁴ ............... B29C 59/02; B29C 65/08
[52] U.S. Cl. ............... 156/73.1; 156/219; 156/245; 156/309.6; 264/23; 264/219; 264/248; 264/250; 264/293
[58] Field of Search ............... 156/73.1, 245, 309.6, 156/219, 580.2; 264/23, 219, 248, 250, 293; 425/174.2

[56] References Cited

U.S. PATENT DOCUMENTS

| | | | |
|---|---|---|---|
| 2,442,022 | 5/1948 | Schulz | 264/293 |
| 4,051,218 | 9/1977 | Hotton | 156/309.6 |
| 4,564,932 | 1/1986 | Lange | 156/73.1 |
| 4,647,325 | 3/1987 | Bach | 156/73.1 |

FOREIGN PATENT DOCUMENTS

| | | |
|---|---|---|
| 0094273 | 11/1983 | European Pat. Off. . |
| 0117576 | 9/1984 | European Pat. Off. . |
| 2832891 | 2/1980 | Fed. Rep. of Germany ........ 264/23 |

Primary Examiner—Michael Wityshyn
Attorney, Agent, or Firm—Norman N. Spain

[57] ABSTRACT

A disc-shaped information carrier (1) is formed by welding two injection-moulded plastics discs concentrically to each other (1A, 1B), which discs are manufactured by means of a method comprising the manufacture of a matrix (9), which matrix is formed with recesses (6) which form projections (5A, 5B) on the disc during injection-moulding and which are fused to the facing disc during welding. Said recesses are formed in the matrix by pressing an indenter pin (7) having a pointed end (8) into the matrix surface, to form locally pit-shaped recesses each surrounded by a ridge (11) of displaced material, which ridge has a volume which is substantially equal to the volume of the pit-shaped recess, so that during injection-moulding the disc is provided with a corresponding pin-shaped projection which is surrounded by a groove (12) which can receive the volume of that part of the pin which is melted during welding.

3 Claims, 2 Drawing Sheets

METHOD OF MANUFACTURING AN OPTICALLY READABLE DISC RECORD AND DISC RECORD MANUFACTURED IN ACCORDANCE WITH THE METHOD

The invention relates to a method of manufacturing an optically readable disc record comprising two discs which are injection-moulded from a plastics material and which are concentrically affixed to each other by welding, which method comprises: manufacturing a thin-disc shaped matrix making local recesses in the matrix to form moulded-on projections on the disc, and arranging the discs on each other and by applying energy at least partly melting said projections to weld the discs to each other.

Optically readable disc records constructed by arranging two or more discs on each other are known per se in various versions For example, from U.S. Pat. No. 4,074,282 an optically readable disc record which can be inscribed by means of a laser beam is known, which disc record comprises a transparent substrate provided with a radiation-sensitive layer adjoining a space which is covered by a cover disc. The substrate and the cover disc are interconnected by annular spacers at the outer circumference and near a central aperture. The cover disc may also be a substrate, thus forming an information disc which can be inscribed on two sides. The transparent substrate through which the laser beam can reach the sensitive layer may consist of glass or a suitable plastics. The discs and the annular spacers can be interconnected by means of an adhesive, by soldering etc. It is obvious that when one or more plastics discs are used the annular spacers need not be separate parts but they may be integratal with one or more of the plastics discs.

European Patent Application No. 0,117,576 describes an optically readable disc having a flat plastics substrate of comparatively high flexural stiffness over which a cover of substantially lower flexural stiffness is arranged so as to enclose a space. This cover may also be made of a plastics. Again the substrate and the cover can be interconnected by glueing etc.

When two plastics discs are affixed to each other the two discs can be interconnected by a method which is known from the plastics technology and which does not require the use of glue or another adhesive. This is because thermoplastic materials can be melted comparatively easily, so that by the local application of energy plastics parts can be interconnected by locally melting the material. European Patent Application No. 0,094,273 (herewith incorporated by reference) proposes a method of manufacturing an optically readable disc record comprising two thermoplastic discs which are interconnected by the method outlined above. The discs may be interconnected by, for example, ultrasonic welding For connection methods such as ultrasonic welding it is essential that the applied energy is locally concentrated so as to ensure that at the location of the concentration enough heat is developed for locally melting the plastics Therefore, it is necessary to provide at least one of the two plastics parts with pointed or sharply projecting portions. This means that the matrix, which may have been manufactured by electroforming, must be formed with a recessed profile which is the negative of the projections to be formed during injection moulding. In practice, it is found difficult to provide the matrix with recesses of such a shape and dimensional accuracy that the injection-moulded product is formed with sharply projecting portions having the required dimensional accuracy.

As is described in the said European Patent Application No. 0,094,273 the projecting portions can be formed by cutting a pattern of elongate grooves in a matrix. It has also been proposed, instead of a pattern of elongate grooves, to cut an uninterrupted circular groove in the matrix, so that the injection-moulded product has a continuous circular ridge (EP No. 0,204,378 A1, not duly published).

In practice, the matrices used in the manufacture of optically readable discs are generally manufactured by means of an electroplating process, generally from nickel or a nickel alloy. Alternatively, plastics matrices are also known. The method of depositing a metal from an electroplating bath gives rise to local differences in density, hardness etc. in a metal matrix. A result of this is that the customary method of forming the recesses, for example in the form of a circular groove in the matrix, gives rise to deformation of the matrix. It is therefore difficult to manufacture a well-defined product by means of such a matrix, which may lead to undesired birefringence effects in the disc material and problems with ultrasonic welding. This is because ultrasonic welding is a comparatively critical process requiring a well-defined shape of the moulded-on projections and a correct mating of the portions to be interconnected. It is found not to be advisable to form the recesses in the matrix by the transfer of corresponding projections on the substrate on which the matrix is produced. It appears that inaccuracies in the replication process may give rise to protrusions on the back of the matrix. Such protrusions are not permissible because the matrix must bed perfectly against a face plate in the injection-moulding die. Methods of forming recesses by removing material from the matrix by means of a tool always have the disadvantage that the material removed from a recess may contaminate and cannot, or with great difficulty, be removed from the part of the disc provided with the microstructure to be replicated.

It is the object of the invention to provide a method of manufacturing optically readable disc records of the type defined in the opening paragraph, which does not lead to the above problems and which enables the matrix to be formed with recesses in an economic, rapid and well-defined manner. To this end the invention is characterized in that for forming said recesses use is made of an indenter pin having a sharp end which is impressed into the matrix surface, thereby locally forming a pit-shaped recess surrounded by a ridge of displaced material whose volume is substantially equal to the volume of the pit-shaped recess, in such a way that during injection-moulding the disc is formed with corresponding pin-shaped projections each surrounded by a groove whose volume is substantially equal to the volume of that portion of the projection which protrudes from the disc surface. The invention is based on the recognition of the fact that deformation as a result of internal stresses of the matrix can be precluded by the localised formation of the recesses. No material is removed from the matrix, so that the microstructure of the information area of the matrix cannot be contaminated. It is to be noted that it is known from EP No. 0,168,750 A1 to provide a plastics disc with projections for the purpose of ultrasonic welding and adjacent the projections recesses for receiving the molten material.

However, this document does not disclose a method of deforming the matrix surface in the manner described above.

In order to obtain a rapid and accurate method requiring minimal manipulation of the matrix, to minimize the risk of damaging and/or contamination of the matrix surface, an embodiment of the inventive method is characterized in that an auxiliary tool is employed which is pressed against the matrix surface with an annular pressure face, which auxiliary tool has a plurality of cavities in which indenter pins are arranged in such a way that their ends partly project from the pressure face and the clearance between the indenter pin and the inner wall of the cavity is adequate to receive said ridge of displaced material. This method enables all the recesses to be formed simultaneously at well-defined locations in a single operation.

Some optically readable discs are provided with identical information structures on both sides. This is for example the case with laser-inscribable optical discs which on each side are provided with control grooves for the purpose of guiding the laser beam and with digital address data in each groove. An embodiment of the invention which is advantageous for manufacturing discs of this type is characterized in that each of the discs is manufactured by means of a matrix provided with said pit-shaped recesses, so that both discs are formed with pin-shaped projections, each pin-shaped projection on each disc belonging to a set of projections which are situated at equal distances both from the centre of the disc and from one another, the projections of one disc being interposed between the projections of the other disc, in which position the discs are interconnected. When this method is used only one matrix is needed because the two discs together forming the optically inscribable disc record are fully identical to each other.

It may be interesting to form a disc by means of the last-mentioned method which, in accordance with the invention, is characterized in that the melting zones constitute an uninterrupted chain of contiguous melting zones which seal the discs hermetically to each other.

Figure 2:
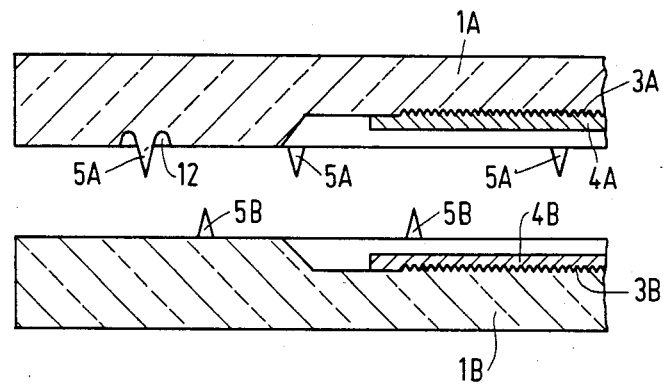
Figure 3:
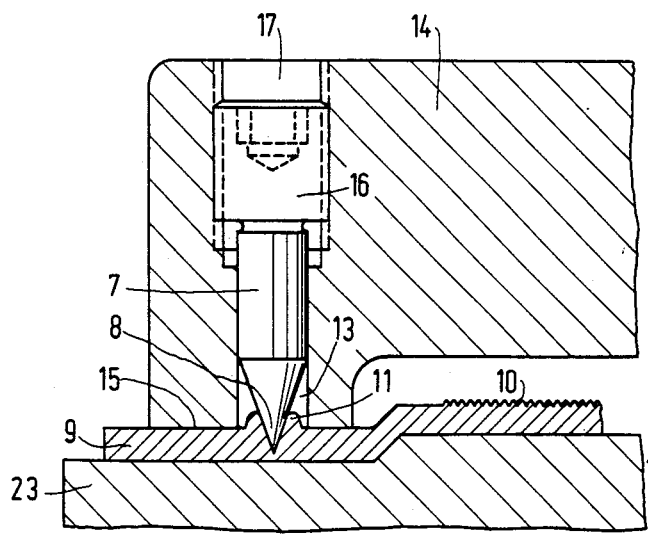
Figure 4:
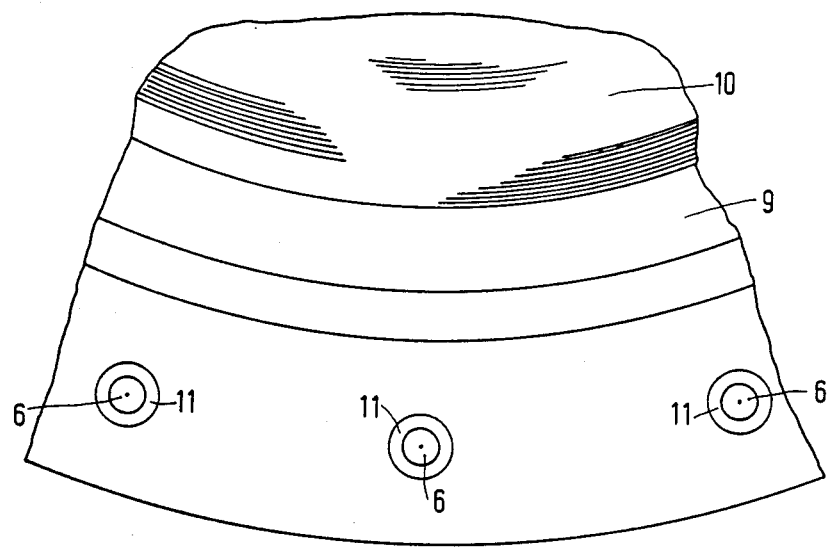
Figure 5:
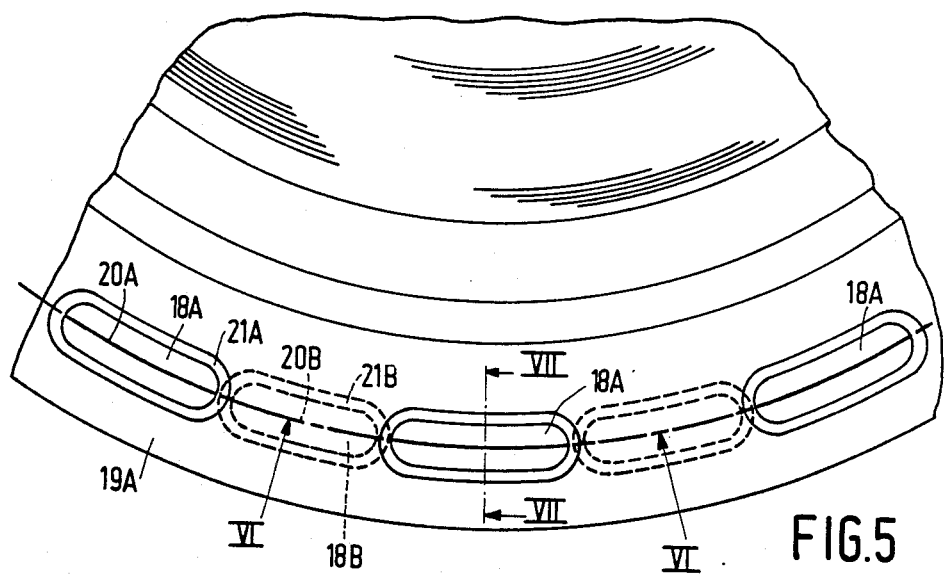
Figure 6:
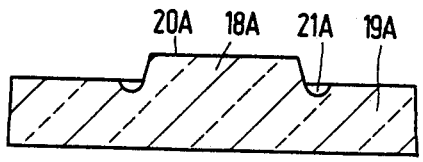
Figure 7:
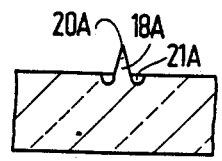

Embodiments of the invention will now be described in more detail, by way of example, with reference to the accompanying drawings, in which FIG. 1 is a perspective view of an optically readable disc record cut in half, comprising two concentrically interconnected identical discs, FIG. 2 is an enlarged-scale cross-sectional view taken at the periphery of the disc of FIG. 1, FIG. 3 is a highly enlarged cross-sectional view of a part of the matrix and a tool for forming recesses in the matrix, FIG. 4 is an enlarged-scale view of a peripheral part of a matrix formed with recesses by means of the tool of FIG. 3, FIG. 5 is an enlarged-scale view of a part of an injection-moulded disc formed with projections of a different shape which are spaced from each other so as to interdigitate with corresponding projections on a second disc, FIG. 6 shows a projection in a sectional view taken on the lines VI–VI in FIG. 5, and FIG. 7 shows a projection in a sectional view taken on the lines VII—VII in FIG. 5.

The disc record 1 of FIG. 1 comprises two concentric discs 1A and 1B hich are injection-mouled from a thermo-plastic material and which are interconnected by ultrasonic welding. This disc record is of the DOR (Digital Optical Recording) type, which can be inscribed on both sides by means of a laser beam and which comprises identical discs which are ultrasonically welded to each other in such a way that an air chamber 2 is formed between them. The discs, see FIG. 2, are transparent and their sides facing the air chamber 2 are provided with a microstructure 3A, 3B which is transferred from a matrix and which is covered with a reflecting recording layer 4A, 4B. For the sake of clarity this layer, which consists of a suitable metal alloy and which can be deposited by for example sputtering, and the microstructure 3A, 3B are shown to an exaggerated scale. The microstructure comprises a multitude of concentric grooves serving as positional reference for a radiation spot which is formed by a laser and which is controlled by a servosystem. Local pits or holes representing the digital information can be formed in the recording layer by pulsing the laser energy. The grooves may be provided with address information by means of the replication process, so that a read laser-beam constantly receives information about the location of the radiation spot on the disc. Such DOR discs are known per se and are therefore described only in so far as this is necessary for a correct understanding of the invention.

A thin disc-shaped matrix manufactured by an electroforming process is located in the injection-moulding machine used for manufacturing the discs 1A and 1B. Such injection-moulding machines are commonly used for the replication of plastics discs and are therefore not shown in the drawing. The matrix exhibits, in negative form, the microstructure which has been transferred from a master or a mould derived from this master. As will be described hereinafter, the matrix is locally formed with recesses to form the moulded-on projections 5A on the disc 1A. The discs are interconnected by arranging these discs onto each other, starting from the position as shown in FIG. 2, and fusing the projections, together with those portions of the facing disc against which the projections abut, to each other by locally applying energy, for example ultrasonic energy. This method of interconnecting thermoplastic parts is a process which is widely used in the industry and therefore is not described in more detail.

As is shown in particular in FIG. 3, forming the recesses 6 in the matrix in order to obtain the projections 5A and 5B is effected by means of an indenter pin 7 having a pointed end 8 which is impressed into the surface of the matrix 9. Locally this results in a pit-shaped recess 6 surrounded by a ridge 11 of displaced material. Since the material is displaced only the volume of the ridge 11 will be substantially equal to the volume of the pit-shaped recess 6. Thus, during injection-moulding the manufactured discs 1A and 1B will be formed with corresponding pin-shaped projections 5A and 5B which are surrounded by a groove 12 whose volume is substantially equal to the volume of that part of the projection which protrudes from the disc surface. In this way the pit-shaped recesses are formed simply without producing stresses in the matrix material and without the need to remove material from the matrix and, moreover, when the two discs are welded to each other the molten material of the projections can escape to the associated grooves. Thus, the disc surfaces are positioned onto each other at their peripheries, so that a well-defined product is obtained.

The indenter pin 7 is arranged in a cavity or bore of an auxiliary tool 14. This auxiliary tool, which is shown only partly in FIG. 3, is pressed against the surface of the matrix 9 with an annular pressure face 15. The indenter pin 7 forms part of a bolt whose threaded head 16 is screwed into a threaded bore 17 in the tool 14, which bore is coaxial with the bore 13. The distance over which the end 8 of the pin 7 projects from the pressure face 15 of the auxiliary tool can be adjusted by turning the bolt 16 inwards or outwards. The clearance between the end 8 and the wall of the bore 13 is adequate to receive the ridge 11 of displaced matrix material. The auxiliary tool 14 is provided with a plurality of bolts 16, so that simultaneously a plurality of recesses 6 can be formed in the surface of the matrix 9. This results in a very rapid and accurate process, so that manipulation of the vulnerable matrix is restricted to a minimum.

The discs 1A and 1B are manufactured by means of the same matrix 9 and consequently they are both provided with pin-shaped projections 5A and 5B respectively. FIG. 4 shows that the recesses 6 are so distributed over the circumference of the matrix 9 that they are situated equidistantly from the centre of the matrix and from one another. The result is that each pin-shaped projection on each disc belongs to a set of projections which are situated equidistantly from the centre of the disc and from one another. The projections of one disc are interposed between the projections of the other disc and in this position the two discs are interconnected. In this way a regular pattern of melting zones is formed along the circumference of the disc.

This method enables an optically readable disc to be manufactured whose air chamber 2 is hermetically sealed from the surrounding atmosphere. For this purpose the melting zones must be arranged so close to one another that they form an uninterrupted chain of contiguous melting zones. This will be illustrated by means of FIG. 5, which relates to a slightly modified embodiment of the invention.

The projections 18A on the disc 19A in FIG. 5 are not conical, like the projections 5A and 5B of the discs 1A and 1B, but rather have an elongate roof-shape. However, their cross-sectional shape is substantially the same, as is apparent from FIG. 7. Instead of a sharp point as the projections 5A and 5B they have a sharp crest 20A where the energy applied during welding is concentrated. The projection 18A is surrounded by a groove 21A whose volume is substantially equal to that of the part of the projection 18A which protrudes from the surface of the disc. The molten material can thus escape to the groove 21. For manufacturing the roof-shaped projections an indenter pin is needed which differs from the indenter pin 7 in FIG. 3. Instead of a conical pointed end 8 the indenter pin now required has a knife-shaped sharp end corresponding to the roof-shaped projection 18. Since after the comprehensive description of the pin 7 of FIG. 3 it will be obvious to those skilled in the art how to modify this pin in the appropriate manner, the modified pin is not shown and is not described any further. FIG. 5 shows that the disc 19A carries sharp roof-shaped projections 18 at regular distances from each other and at equal distances from the centre of the disc. The outlines of the identical projections 18B on the disc 19B, which is not shown and which is to be secured to the disc 19A, are indicated on the surface of the disc 19A in broken lines. The grooves 21A and 21B surrounding the projections 18A and 18B respectively slightly overlap each other in order to ensure that the melting zones form an uninterrupted chain of contiguous melting zones during welding of the disc and the discs are hermetically sealed to each other.

A practical embodiment of an inscribable optically readable disc as shown in FIGS. 1 and 2 has a diameter of approximately 13 cm. It is manufactured by means of a matrix of pure nickel which is deposited by electroforming with a thickness of approximately 0.3 mm. The thickness of the discs is approximately 1.4 mm in the area provided with the microstructure. The air chamber has a height of some tenths of millimetres. The pins used for making the pit-shaped recesses in the matrix have an apex angle of approximately 65°. The pin penetrates into the matrix material over approximately 0.2 mm and thus forms a conical pit-shaped recess whose base has a diameter of approximately 0.25 mm. It is evident that this only results in localized deformation of the matrix material. Deformation of the material as a result of internal stresses during formation of the recesses is substantially precluded. The inventive method can be carried out very simply because only a satisfactorily flat supporting surface 23 is required for the matrix when the tool 14 is pressed against the matrix surface.

The invention is not limited to the embodiments shown and includes all embodiments possible within the scope of as defined by the appended claims. For example if desired, the pin-shaped projections formed on the discs during injection-moulding may be given an entirely different shape. It is important only that the indenter pin which is employed has a sharp end to form a pin-shaped projection having a sharp end. This end may be pointed or elongate, as in the embodiments described. In principle, there is a substantial freedom with respect to the elongate shapes which are possible but in practice more intricate shapes of the pin-shaped projection will generally be less attractive because they require a more intricate tool for manufacturing the matrix. Although the description only mentions pin-shaped projections at the periphery of the disc, many discs also require the provision of pin-shaped projections near the central aperture 22 of the disc. These projections can be formed in an identical way.

If desired, more intricate patterns of recesses, as distinct from those shown in FIGS. 4 and 5, may be used. The recesses may belong to different sets, each set having another distance from the centre of the disc. This is necessary, for example, when the method in accordance with the invention is used for manufacturing discs as described in the afore-mentioned European Patent Application No. 0,094,273.

It is not necessary to provide both discs with a pattern of projections; in some cases it is adequate to provide a pattern on only one of the discs. This is of particular advantage if the discs also differ from each other in other respects. The afore-mentioned European Patent Application No. 0,117,576 discloses an optical disc record which can be inscribed on one side only. On its other side it is provided with a flexible cover disc or cover which, like the disc, can be made of a plastics. Since no matrix at all is needed for manufacturing the cover, it may be advantageous to arrange the projections only on the disc provided with the microstructure. Even in such a case it may be possible to achieve hermetic sealing between the disc and the cover. The pattern of pits for the disc of FIG. 5 may, for example, be supplemented with a second pattern of pits interposed between those of the first pattern, if desired at another diameter in such a way that the ridges surrounding the pits are contiguous or at least substantially contiguous.

It is not necessary to press all pits into the matrix with a single tool in one step. Several steps and, if desired, several tools may be utilized.

Many more embodiments may be designed without departing from the gist of the invention, which is to use an indentation tool to provide only local indentations in the matrix, which will result in well-defined pin-shaped projections suitable for welding.

What is claimed is:

1. A method of manufacturing an optically readable disc record comprising two discs which are injection molded from a plastics material and which are concentrically affixed to each other by welding, which method comprises:

(a) manufacturing a thin disc-shaped matrix,
    (b) making local recesses in the matrix,
    (c) injection-molding discs from said matrix, said discs having projections corresponding to said recesses,
    (d) arranging two of said discs on each other in a manner such that projection-free areas in one disc contact projections in an opposing disc,
    (e) and applying energy to at least partly melt said projections to weld the discs to each other, characterized in that for forming said recesses use is made of an indenter pin having a sharp end which is impressed into a surface of said matrix, thereby locally forming a pit-shaped recess surrounded by a ridge of displaced material whose volume is substantially equal to the volume of the pit-shaped recess, and that during injection-moulding each disc is formed with corresponding pin-shaped projections each surrounded by a groove whose volume is substantially equal to the volume of that portion of the projection which protrudes from the disc surface.

2. A method as claimed in claim 1, characterized in that an auxiliary tool is employed which is pressed against a matrix surface, which auxiliary tool has an annular pressure face with a plurality of cavities in which indenter pins are arranged in such a way that their ends partly project from the pressure face and the clearance between each indenter pin and the inner wall of the respective cavity is adequate to receive said ridge of displaced material.

3. A method as claimed in claim 1, characterized in that each of the discs is manufactured by means of a matrix provided with said pit-shaped recesses, so that both discs are formed with pin-shaped projections, each pin-shaped projection on each disc belonging to a set of projections which are situated at equal distances both from the center of the disc and from one another, the projections of one disc being interposed between the projections of the other disc, in which position the discs are interconnected.

* * * * *